United States Patent [19]

Svensson et al.

[11] 3,930,571

[45] Jan. 6, 1976

[54] APPARATUS FOR ALIGNING ELONGATED ARTICLES

[75] Inventors: Lars H. Svensson, Winterthur; Pierre Luginbuhl, Neuhausen am Rheinfall, both of Switzerland

[73] Assignee: SIG Schweizerische Industrie Gesellschaft, Neuhausen am Rheinfall, Switzerland

[22] Filed: Aug. 29, 1974

[21] Appl. No.: 502,234

[30] Foreign Application Priority Data
Sept. 6, 1973 Switzerland.................... 12838/73

[52] U.S. Cl................. 198/25; 198/287; 198/209; 221/167
[51] Int. Cl.²........................................ B65G 47/00
[58] Field of Search....... 198/287, 25, 220 BC, 289, 198/209, 103; 221/167, 171, 173

[56] References Cited
UNITED STATES PATENTS
1,373,605   4/1921   Eberly................................. 198/287
2,901,095   8/1959   Smith.............................. 198/220 BC
3,508,639   4/1970   Braden................................ 198/287
3,722,658   3/1973   Sterling................................ 198/287

FOREIGN PATENTS OR APPLICATIONS
1,006,239   4/1957   Germany........................... 221/167

Primary Examiner—Robert J. Spar
Assistant Examiner—James M. Slattery
Attorney, Agent, or Firm—Spencer & Kaye

[57] ABSTRACT

In apparatus for aligning a stream of elongate articles, such as chocolate bars, delivered in a randomly ordered arrangement to a turntable, the apparatus including a stationary guide rail disposed above the turntable and extending along a path which spirals outwardly away from the axis of turntable rotation, the speed and reliability of the aligning operation are improved by forming the guide rail to have a series of breaks in the guide path which it defines and by disposing the rail so that articles come to abut only against the surface thereof which faces away from the turntable axis.

6 Claims, 1 Drawing Figure

U.S. Patent  Jan. 6, 1976  3,930,571
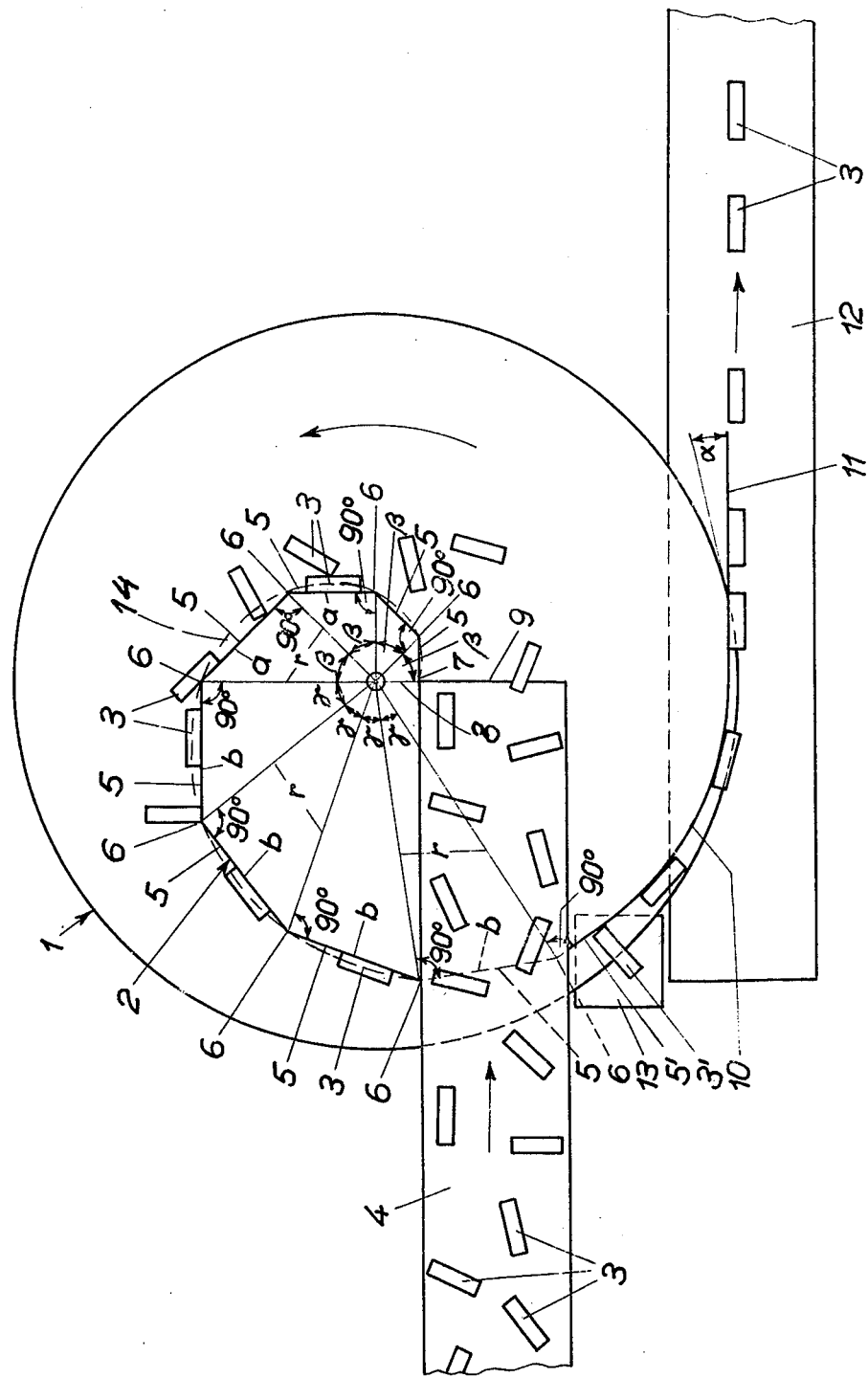

APPARATUS FOR ALIGNING ELONGATED ARTICLES

BACKGROUND OF THE INVENTION

The present invention relates to an apparatus for aligning elongate articles, for example chocolate bars, which are furnished in a random arrangement, the apparatus being of the type including an input path via which the randomly arranged articles are furnished to a turntable above which a spiral guide rail is disposed which is part of a stationary frame and at which the articles carried along by the turntable abut so as to be aligned, and an outlet path over which the aligned articles are transported away once they are pushed off the edge of the turntable by the guide rail.

In a known apparatus of this type, as disclosed, for example, in U.S. Pat. No. 3,640,373, a plurality of such guide rails are provided and are arranged so that the articles alternately contact the outer wall and the inner wall of successive guide rails. Each spiral guide rail follows a smooth curve, i.e. one which is free of sharp changes in direction, which is concave toward the axis of the turntable, and the rail guide surfaces are also inclined with respect to the plane and the rail of the turntable.

SUMMARY OF THE INVENTION

It is an object of the present invention to increase the output of such known device, i.e. to better align a larger number of articles per unit of time without increasing the diameter of the turntable.

The invention results from the surprising discovery that such improvement can be achieved by forming the guide rail to present breaks, or sharp changes in direction, along its guide surface and by disposing the rail so that the articles always come to rest against its outer surface, i.e. the surface remote from the turntable axis.

BRIEF DESCRIPTION OF THE DRAWING

The single FIGURE is a schematic plan view of one preferred embodiment of the present invention.

DESCRIPTION OF THE PREFERRED EMBODIMENTS

The alignment apparatus illustrated in the FIGURE includes a turntable 1 which is driven to rotate at a constant speed in the direction of the arrow. A spiral guide rail 2 fastened to the machine frame to be held stationary is disposed above the turntable 1 so that the lower edge of the rail is a small distance above the turntable surface. The speed of the turntable 1 is set so that the centrifugal force acting on the articles to be aligned will not impede the function of the guide rail. The spacing between the lower edge of guide rail 2 and turntable 1 may be, for example, about 1 mm, the guide rail 2 being supported along its upper edge by frame portions which are not illustrated. The height of the guide rail, whose side surfaces are perpendicular to the turntable 1, is greater than the thickness, or height, of the articles 3 to be aligned, e.g. chocolate bars.

The bars 3 are transported to the turntable 1 by means of an endless input conveyor 4 on which they arrive in a randomly ordered fashion, turntable 1 as well as guide rail 2 being disposed somewhat below this conveyor 4. The bars 3, which drop randomly onto turntable 1 from the end of conveyor 4, are carried along in rotation by the turntable so that each bar eventually comes to abut against the outer surface of guide rail 2.

Guide rail 2 consists essentially of linear sections 5 which succeed one another and meet at break points 6. The beginning 7 of guide rail 2 is on a radius 8 which emanates from the axis of turntable 1 and above which, of course to the outside of guide rail 2, is disposed the discharge edge 9 of the input conveyor 4. The last section 5' of the rail 2 includes a circular arc section 10 tangential with a leading section and followed tangentially by a linear end section 11 extending beyond the edge of turntable 1 and intersecting that edge at a small angle $\alpha$.

The chocolate bars 3, which are pushed along this section 11 by turntable 1 are thus finally pushed beyond the edge of the turntable so that they reach an endless outlet conveyor 12 disposed just below the turntable. The outer edge of the turntable is advantageously designed as a conical jacket surface which slopes downwardly and outwardly so that during transfer the articles will not drop abruptly onto the outlet conveyor 12 but slide over onto it. The chocolate bars 3 are then aligned on conveyor 12 in a single line so that they can be transported, for example, to a packaging machine which requires such alignment.

Such alignment is achieved in that the chocolate bars 3, which initially arrive in close profusion and abut against the first section 5 of the guide bar 2 or against one another, are pulled apart by the advancement along the guide bar and are subjected to rotation, particularly at the break points 6, which causes one of their longitudinal sides to eventually come to rest against guide rail 2. The aligning effect of the guide rail 2 is substantially greater, as a result of these break points 6, than that of the known spiral guide rails having a continuous curvature. Of course, the chocolate bars 3 are shown in the drawing in a purely schematic manner.

In quite rare cases it may happen that a chocolate bar 3' will reach the end section 11 of guide rail 2 not completely aligned so that it contacts the rail with its one frontal, or narrow, face. As a result the unaligned bar 3' drops off the turntable 1 much earlier than the aligned bars 3 so that it can be collected in a vessel 13 provided in front of the outlet conveyor 12 in order to be then reintroduced to the inlet conveyor 4 at some later time.

In the present case the first four break points 6 are disposed on a logarithmic spiral 14 shown in dashed lines and having its start at point 7. The first four sections 5 subtend sector angles $\beta$ about the axis of turntable 1, of 45° each. Each section 5 is perpendicular to the radius $r$ from the turntable axis to its starting point and has a length $a$ which is equal to its associated radius $r$. The subsequent sections 5 are also perpendicular to the radii $r$ of their starting points, but each having a constant length $b$, however, so that their sector angles $\gamma$ decrease from one section to the next in the direction toward the end of the guide rail. With such a shape of the guide rail, an excellent alignment effect has been realized in practice with, for example, a turntable diameter of about 1m and chocolate bars of about 5cm length and 1.5cm width. Suitable values of $a$ are in the range of 50–180 mm, and of $\gamma$ in the range of 25°–30°, while $b$ may have a value of about 200 mm.

The sections 5 of the guide rail disposed between break points 6 need not necessarily be linear since satisfactory results can also be expected with a slightly convex or concave curvature. The break points 6 which are necessary in order to obtain the above-mentioned increase in efficiency could also be slightly rounded. Such rounding may be advantageous depending on the shape and surface structure of the articles. Moreover, particularly delicate articles, for example chocolate coated and/or nut sliver covered articles, can best be handled with such a rail in order to avoid damage to the articles and excess soiling of the apparatus. The radius of curvature of the break points 6 may be of 20–40 mm.

In the illustrated embodiment the inlet and outlet paths are parallel to one another. Of course any desired angles between the two path directions are conceivable. In this way, the apparatus can easily be adapted to the arrangement conditions between the machines involved.

The apparatus illustrated in the drawing is provided with but one spiral guide rail above the turntable. In special cases it may however be advantageous to provide two or more successively acting guide rails. The innermost rails are then not brought to the outer edge of the turntable but only to the region of an also stationary deflection member. This deflection member takes over the articles discharged by the guide rail and guides them back to the center region of the turntable. Here the articles come into engagement with a second guide rail designed as described above so that they finally are pushed beyond the edge of the turntable onto the outlet conveyor.

It will be understood that the above description of the present invention is susceptible to various modifications, changes and adaptations, and the same are intended to be comprehended within the meaning and range of equivalents of the appended claims.

We claim:

1. In apparatus for aligning randomly arriving elongate articles and including a substantially horizontally disposed turntable mounted for rotation, at least one stationary spiral guide rail disposed above the turntable and lying generally along a spiral path which extends, in the direction of turntable rotation, from a point in the vicinity of the turntable axis to the turntable periphery, means for delivering randomly ordered articles to the turntable in a region near the starting point of the spiral and spaced radially outwardly from such starting point, and means, adjacent the periphery of the turntable in the region where such articles are pushed off of the turntable by the guide rail, for conveying aligned articles away from the turntable, the improvement wherein said guide rail is formed to be constituted by a plurality of sections which succeed one another along the spiral path, with each section being at a greater distance from the turntable axis of rotation than its immediately preceding section, said sections being oriented relative to one another in such a manner as to present a sharp change in direction between adjacent sections, and said guide rail is disposed for causing articles on the turntable to engage only the surface thereof which is directed away from the axis of turntable rotation.

2. Apparatus as defined in claim 1 wherein said breaks are constituted by slightly rounded portions of said rail.

3. Apparatus as defined in claim 1 wherein said guide rail comprises linear sections between said changes in direction.

4. Apparatus as defined in claim 3 wherein each said linear section of said guide rail is perpendicular to the radial line extending from the axis of rotation of the turntable to the end of that section which is nearer such axis.

5. Apparatus as defined in claim 4 wherein a plurality of adjacent sections of said guide rail extending along the portion of said spiral path nearest the turntable axis of rotation subtend identical sector angles about such axis and the successive sections following such plurality of adjacent sections subtend sector angles of progressively decreasing size.

6. Apparatus as defined in claim 1 wherein the surface of said guide rail which is directed away from the turntable axis is perpendicular to the plane of the turntable.

* * * * *